United States Patent
Ghai et al.

(10) Patent No.: US 7,483,902 B2
(45) Date of Patent: Jan. 27, 2009

(54) SYSTEM AND METHOD FOR CREATING AND USING SELF DESCRIBING EVENTS IN AUTOMATION

(75) Inventors: Rohit Ghai, Nesconset, NY (US); Edward Grinvald, Brooklyn, NY (US)

(73) Assignee: Computer Associates Think, Inc., Islandia, NY (US)

( * ) Notice: Subject to any disclaimer, the term of this patent is extended or adjusted under 35 U.S.C. 154(b) by 533 days.

(21) Appl. No.: 10/889,734

(22) Filed: Jul. 12, 2004

(65) Prior Publication Data

US 2005/0120330 A1 Jun. 2, 2005

Related U.S. Application Data

(60) Provisional application No. 60/487,038, filed on Jul. 11, 2003.

(51) Int. Cl.
*G06F 17/30* (2006.01)
(52) U.S. Cl. .......................................... 707/100; 707/3
(58) Field of Classification Search ................ 707/1–5, 707/10, 100, 102; 704/6–9, 251, 257
See application file for complete search history.

(56) References Cited

U.S. PATENT DOCUMENTS

| | | | | |
|---|---|---|---|---|
| 5,838,969 A | * | 11/1998 | Jacklin et al. | 719/318 |
| 5,855,014 A | * | 12/1998 | Smith | 707/3 |
| 6,083,276 A | * | 7/2000 | Davidson et al. | 717/107 |
| 6,633,313 B1 | * | 10/2003 | Cirne et al. | 715/744 |
| 6,865,427 B2 | * | 3/2005 | Brown et al. | 700/19 |
| 7,065,493 B1 | * | 6/2006 | Homsi | 705/8 |
| 2004/0064759 A1 | * | 4/2004 | McGuire et al. | 714/39 |
| 2005/0010545 A1 | * | 1/2005 | Joseph | 707/1 |

* cited by examiner

*Primary Examiner*—Cheryl Lewis
(74) *Attorney, Agent, or Firm*—Baker Botts L.L.P.

(57) ABSTRACT

Methods, systems, apparatus and computer-readable media are disclosed for creating and using self describing events in automation. A first exemplary method is disclosed that includes querying a plurality of managed components, receiving a response, and processing each response to select event types as triggers for steps in an automated workflow using attributes of events as arguments to workflow steps. This method further discloses the monitoring, detection, and processing of events defined in the workflow. Processing of an event includes creating a machine readable data payload containing event information including the event type, event attributes, and a grammar to which the event conforms. Using the provided grammar, components in the automated workflow can interpret the data payload and perform the actions defined in the automated workflow. Other methods, apparatus, systems and computer readable media are disclosed for presenting event information.

14 Claims, 3 Drawing Sheets

Figure 1: Example Network Topology

SYSTEM AND METHOD FOR CREATING AND USING SELF DESCRIBING EVENTS IN AUTOMATION

CROSS REFERENCE TO RELATED APPLICATIONS

This application claims priority to and incorporates by reference the entirety of U.S. provisional application entitled "System and Method for Using Self-Describing Events," Ser. No. 60/487,038, filed Jul. 11, 2003.

TECHNICAL FIELD

The present application generally relates to computer system infrastructure management. The present application more specifically relates to systems and methods to facilitate automation of computer system event and work-flow monitoring.

BACKGROUND

Events are ubiquitous in the world of Infrastructure Management, described herein as including Enterprise Management, Security Management and Storage Management. Events typically have several attributes such as timestamp, severity, source, and action. One of the main attributes of an event is the Message attribute. As an example, a message could be the following: "E1005 Backup Job (JobID=5643) failed due on server." Textual messages are amenable to human consumption, allowing a human operator, for instance to visually inspect, sort, and filter events. However, events are also consumed by automation engines, referred to herein as "machine consumption." Machine consumption may include parsing the information inside the message attribute. As an example, in order to trigger an automated workflow process in response to a "backup job failed" event, the JobID parameter is extracted from the textual message. This extraction or parsing has the draw back of being subject to changes in the formatting of the message due to regular software updates or due to other circumstances. Each time the human readable text message format for the event is changed through updates to the system, the parsing routine must also be changed to allow the data to be extracted.

Simple Network Management Protocol ("SNMP") traps can be used to relay a condition or an event. However, it is problematic to determine if a network or storage component is capable of producing an event via SNMP, and if so, the categories and types of events produced. This limitation, combined with a lack of machine-readable event data, makes it difficult to employ SNMP in storage management automation. Products such as Unicenter, developed by Computer Associates ("CA"), the assignee of the present application, provide capabilities to receive events from remote agents. However, in many instances the event management component has no way of establishing the possible events that can be received, making it difficult to create automated management workflows and practices.

Therefore, there is a need for a system and method to generate and use events suitable for machine consumption to facilitate automated workflow management.

SUMMARY

The following presents a simplified summary of methods, apparatus, systems, and computer readable media associated with using self describing events in automation in accordance with the present application. This summary is not an extensive overview and is not intended to identify key or critical elements of the methods, apparatus, systems, and/or media or to delineate the scope of the methods, apparatus, systems, and media. It conceptually identifies the methods, apparatus, systems, and media in a simplified form as a prelude to the more detailed description that is presented later.

In accordance with one aspect of the present application, an exemplary embodiment of a method is disclosed for creating and using self-describing events in automated workflow management. This exemplary method includes querying a plurality of managed components. The method also includes receiving a response from each of the managed components. Included in the response is a list of producible event types, attributes of each event type, and a grammar to which each event type conforms. Pursuant to this embodiment, each response is processed. Processing of the response can include selecting event types to be used as triggers for steps in an automated workflow. Attributes of events can be selected as arguments to workflow steps. One way that this processing can occur is to present the data type information to a user and allow this user to manually select which event types will trigger steps in the automated workflow and which event attributes will be passed as arguments to the workflow steps.

With the workflow defined, the above described method continues by monitoring the plurality of managed components for events defined in the workflow. When an event is detected it is processed. Processing of an event includes creating a machine readable data payload containing event information including the event type, event attributes, and a grammar to which the event conforms. Using the provided grammar, components in the automated workflow can interpret the data payload and perform the actions defined in the automated workflow.

In accordance with a second aspect of the present application, an exemplary apparatus is disclosed for creating and using self-describing events in automated workflow management. This exemplary apparatus comprises a processor with memory. This memory stores a program to control operation of the processor. The processor is operative with the program in memory to query a plurality of managed components. The processor is also operative with the program in memory to receive a response from each of the managed components including a list of producible event types, attributes of each event type, and a grammar to which each event type conforms. Said processor with program in memory can process each response to define desired event types as triggers for steps in an automated workflow using desired attributes of each event type as arguments to workflow steps. One way that this processing can occur is to present the data type information to a user and allow this user to manually select which event types will trigger steps in the automated workflow and which event attributes will be passed as arguments to the workflow steps.

The processor with program in memory can monitor the plurality of managed components and detect events of the event types defined in the automated workflow. When an event is detected it can be processed by the processor in memory. Processing of an event includes creating a machine readable data payload containing event information including the event type, event attributes, and a grammar to which the event conforms. Using the provided grammar, components in the automated workflow can interpret the data payload and perform the actions defined in the automated workflow.

In accordance with a third aspect of the present application, an exemplary system is disclosed for presenting event type information. This system comprises a web browser client.

The system also includes a graphical viewer in communication with the web browser client. The graphical viewer is operative to display event type information including producible event types of managed components, attributes of each event type, and a grammar to which each event type conforms. Pursuant to the this aspect of the current application, a server application is provided. The sever application is in communication with the web browser client and with an event database and an event application. The server application is operative to receive a request for event type information, query the event application and access the event database to respond to a request for event type information. A remote data server is in communication with the graphical viewer. The remote data server is further in communication with at least one platform-specific event database. The remote data server is operative to receive a request for platform-specific event type viewing data and is operative to query the platform-specific event database and respond to the request for platform-specific event viewing data.

In accordance with a fourth aspect of the present application, an exemplary computer-readable storage medium is disclosed. The medium is encoded with processing instructions for creating and using self-describing events. These steps include querying a plurality of managed components. The steps stored on the computer-readable medium also includes receiving a response from each of the managed components queried. Included in the response is a list of producible event types, attributes of each event type, and a grammar to which each event type conforms. Pursuant to this embodiment, each response is processed. Processing of the response can include selecting event types to be used as triggers for steps in an automated workflow. Attributes of events can be selected as arguments to workflow steps. One way that this processing can occur is to present the data type information to a user and allow this user to manually select which event types will trigger steps in the automated workflow and which event attributes will be passed as arguments to the workflow steps.

With the workflow defined, the above described steps stored on the computer-readable medium continue by monitoring the plurality of managed components for events defined in the workflow. When an event is detected it is processed. Processing of an event includes creating a machine readable data payload containing event information including the event type, event attributes, and a grammar to which the event conforms. Using the provided grammar, components in the automated workflow can interpret the data payload and perform the actions defined in the automated workflow.

Certain illustrative aspects of the methods, apparatus, systems and computer-readable media are described herein in connection with the following description and the annexed drawings. These aspects are indicative, however, of but a few of the various ways in which the principles of the methods, apparatus, systems, and media may be employed and thus the examples are intended to include such aspects and equivalents. Other advantages and novel features may become apparent from the following detailed description when considered in conjunction with the drawings.

BRIEF DESCRIPTION OF THE DRAWINGS

For a more complete understanding of the present methods and systems, reference is now made to the following description taken in conjunction with the accompanying drawings in which like reference numbers indicate like features and wherein.

DETAILED DESCRIPTION

Figure 1:
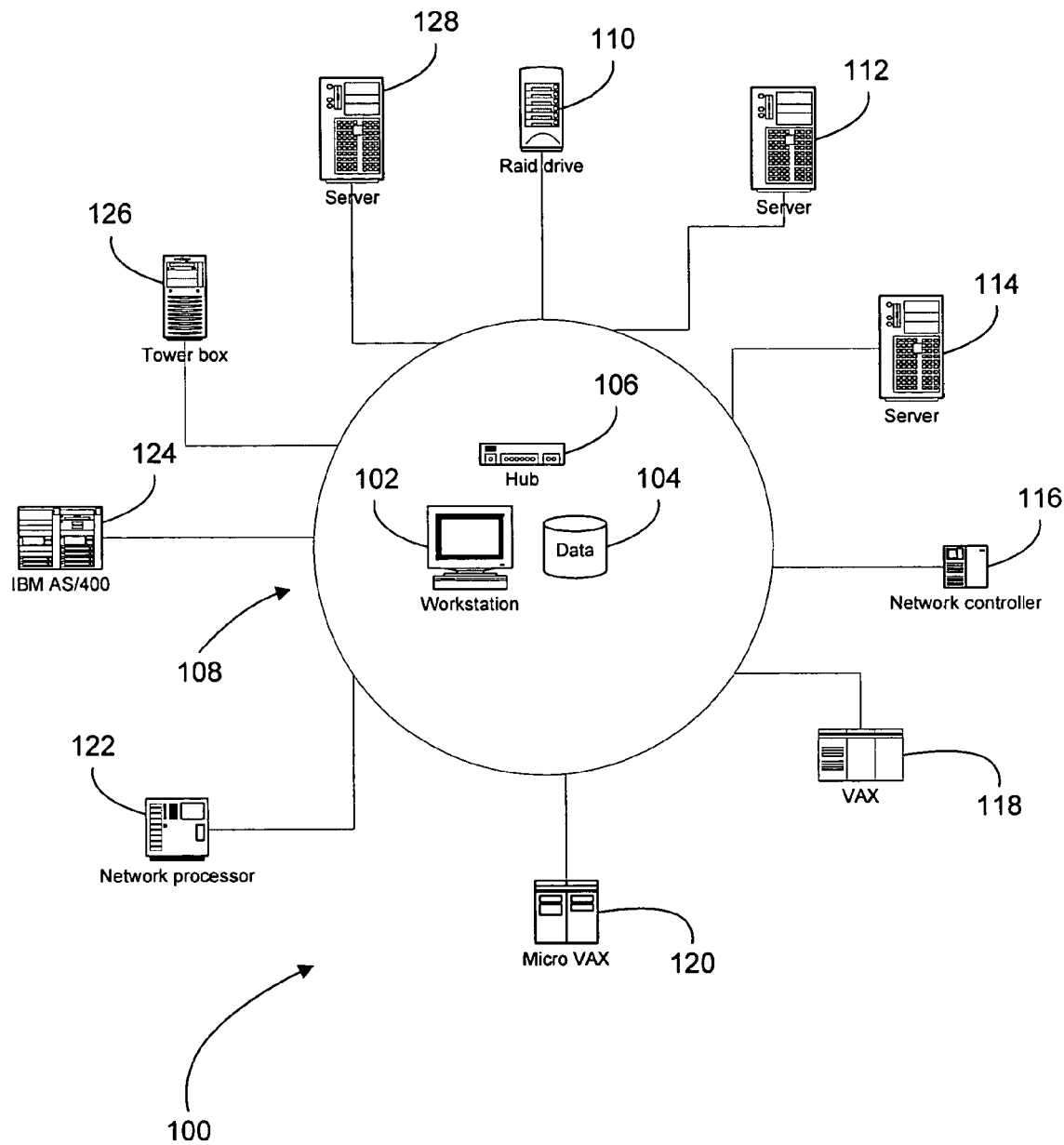
FIG. 1 is a system topology illustrating a diverse collection of managed components connected by a shared network.

Example methods and systems are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify the description.

Referring to FIG. 1, there is illustrated a topology of a system 100 including a diverse collection of managed components connected by a shared network. The system 100 includes a user workstation 102, data 104 and a hub 106 which connect these components to various other system resources via shared network 108. The example system resources illustrated in FIG. 1 include a raid drive 110, servers 112, 114, and 128, network controller 116, VAX 118, Micro VAX 120, network processor 122, IBM AS/400 124 and tower box 126.

In accordance with the present application, workstation 102 includes control logic for creating and/or using self-describing events. In addition, certain managed components, such as raid drive 110, for example, may include control logic for creating self-describing events.

Figure 2:
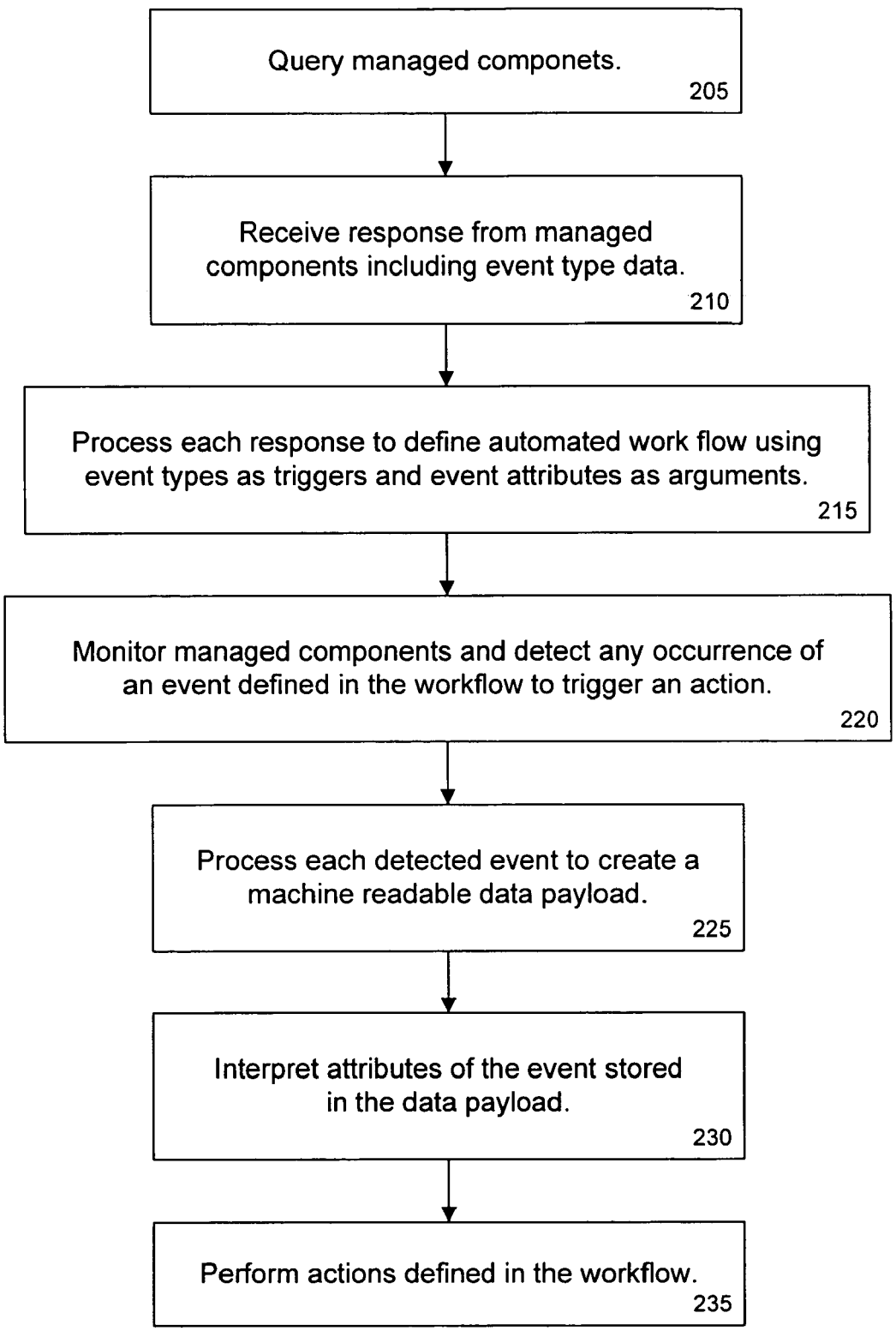
FIG. 2 is a block diagram illustrating an example process for creating and using self describing events in automation.

Referring now to FIG. 2, there is illustrated an example methodology for creating and using self-describing events in an automated work flow application. The methodology may be employed, for example, by workstation 102 working in cooperation with other components of system 100. At block 205, one or more managed components are queried to determine the status of each managed component. A work flow automation application running, for example, on workstation 102 receives responses from the managed components at block 210. Each response includes event type data.

At block 215, each of the responses are processed to define an automated work flow. In the automated work flow, events are used as triggers, and event attributes are used as arguments. Each of the managed components is monitored through periodic polling or other techniques known to those of ordinary skill in the art. Any occurrence of an event that has been defined in the work flow to trigger an action is detected, as shown by block 220. At block 225, each detected event is processed by control logic associated with the associated managed component, and the control logic directs the creation of a machine readable data payload. The control logic may be resident in a memory of the managed component or in a application responsible for monitoring the managed component.

At block 230, the work flow automation application interprets the attributes of each event which are stored in the data payload, and the actions defined in the work flow.

Figure 3:
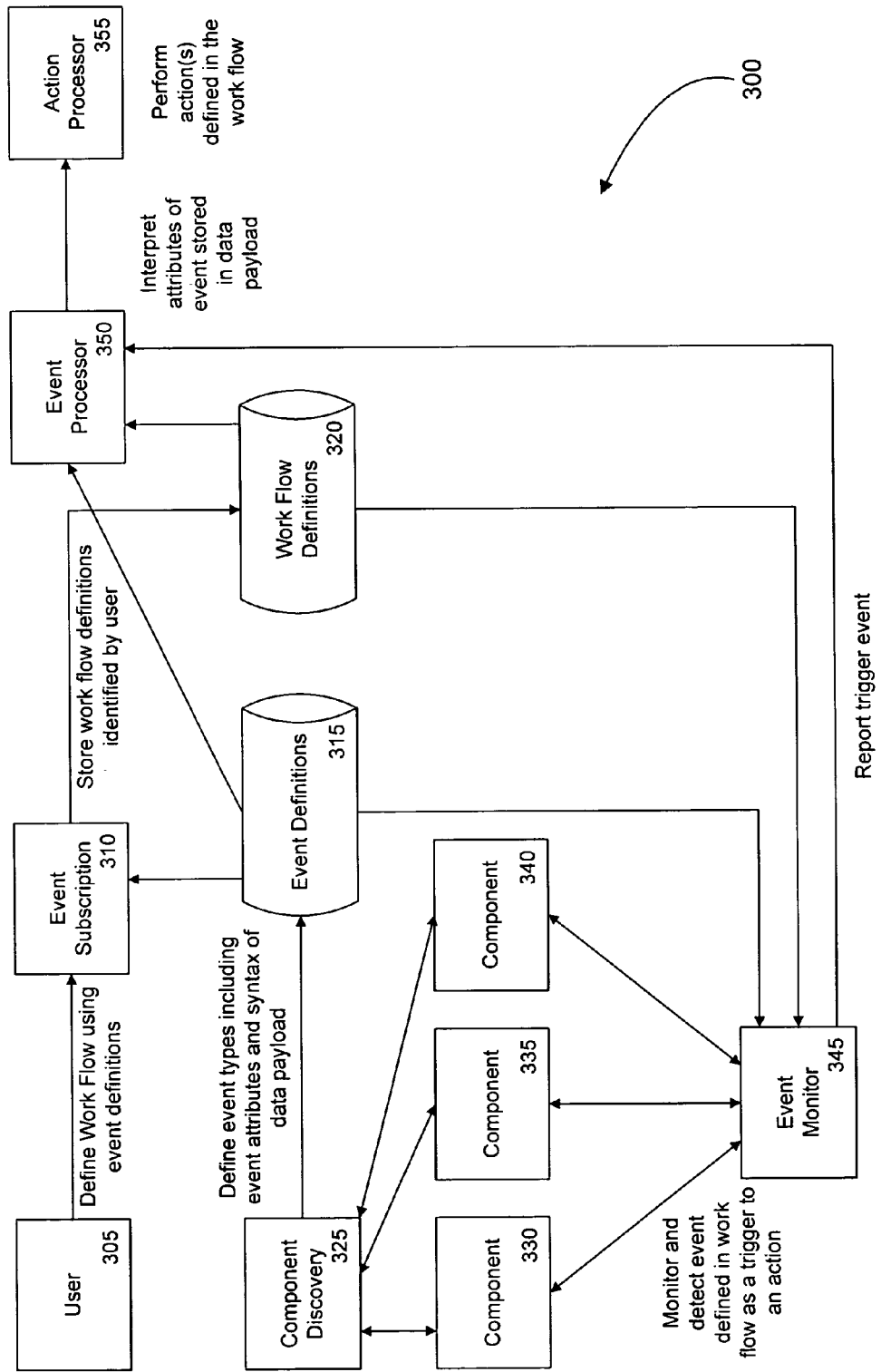
FIG. 3 is a block diagram illustrating an example system for executing the methodology of FIG. 2.

Referring now to FIG. 3, there is illustrated an example system 300 for executing methodology 200. As illustrated, a user 305 employs an event subscription module 310 to define a work flow automation. The work flow automation definition is stored in data store 320. Each work flow definition of data store 320 includes an identification of an event type triggering a work flow action, and an identification of an action to be taken upon the triggering event. The event types of the work flow automation definitions are selected from a store of event definitions 315.

The store of event definitions 315 may be populated by a component discovery module 325. Component discovery module 325 queries each component which may be managed, components 330, 335 and 340 in the present example, to receive event type definitions. Upon receiving a query from component discovery module 325, each component responds with a list of producible event types, a list of attributes for each event type, and a grammar or syntax of a data payload to which each event type conforms. The component discovery module 325 processes each component response to define the event type definitions 315 which may be used as triggers for steps in an automated workflow using desired attributes of each event type as arguments to workflow steps. In one embodiment, the data payload is defined as being in XML form with an associated XML Schema and/or DTD attached to the event. The XML Schema and/or DTD may be obtained by querying the managed component that produced the event.

Event monitor module 345 monitors the components 330, 335 and 340 to detect whether any event defined as a trigger in the work flow definition data store 320 has occurred. Upon detecting a triggering event, event monitor 345 processes the detected event to create a machine readable data payload containing event information including the event type, event attributes, and a grammar to which the event conforms. Event monitor module 345 then provides the triggering event, including the machine readable data payload, to event processor module 350 for processing.

Event processor module 350 processes the data payload in the manner defined by the automated work flow definition of data store 320 according to the provided grammar of the event type to interpret the attributes of the event. Event processing module 320 determines an appropriate action processor module 355 to perform the action based on the automated work flow definition of data store 320 and directs action processor module 355 to perform the action defined by the work flow definition.

What has been described above includes several examples. It is, of course, not possible to describe every conceivable combination of components or methodologies for purposes of describing the systems, apparatus, methods, and computer readable media associated with creating and using self-describing events in automation within an enterprise. However, one of ordinary skill in the art may recognize that further combinations and permutations are possible. Accordingly, this application is intended to embrace such alterations, modifications, and variations that fall within the scope of the appended claims. Furthermore, to the extent that the term "includes" is employed in the detailed description or the claims, such term is intended to be inclusive in a manner similar to the term "comprising" as that term is interpreted when employed as a transitional word in a claim.

What is claimed is:

1. A method for creating and using self-describing events in automated workflow management comprising:

querying a plurality of managed components of a computing system to identify a list of producible, self-described event types that may be experienced by the plurality of managed components for use in generating an automated workflow;

in response to the query, receiving a response from each of the managed components including the list of producible, self-described event types, attributes of each producible, self-described event type, and a grammar to which each producible, self-described event type conforms;

processing each response to define desired event types as triggers for steps in an automated workflow using desired attributes of each event type as arguments to workflow steps;

storing, in a data store, the event types defined as triggers in the automated workflow;

monitoring the plurality of managed components and detecting events of the event types defined in the automated workflow and stored in the data store;

processing each detected event to create a machine readable data payload containing event information including the event type, event attributes, and a grammar to which the event conforms; and using an action processor to process the data payload in the manner defined by the automated workflow, the action processor using the provided grammar of the event type to interpret the attributes of the event and perform one or more actions defined by the automated workflow.

2. The method of claim 1, wherein the response is processed by presenting each managed component's producible event types to a user selecting desired event types for definition as triggers to the automated workflow, said user selecting desired attributes of each event type as arguments to steps in the automated workflow.

3. The method of claim 1, wherein the data payload is in XML form with an associated XML Schema attached to the event.

4. The method of claim 1, wherein the data payload is in XML form with an associated DTD attached to the event.

5. The method of claim 1, wherein the data payload is in XML form and an associated XML Schema is obtained by querying the managed component that produced the event.

6. The method of claim 1, wherein the data payload is in XML form and an associated DTD is obtained by querying the managed component that produced the event.

7. An apparatus for creating and using self-describing events in automated workflow management comprising:

a processor;

a memory connected to the processor storing a program to control operation of the processor;

the processor operative with said program in memory to:

query a plurality of managed components of a computing system to identify a list of producible, self-described event types that may be experienced by the plurality of managed components for use in generating an automated workflow;

in response to the query, receive a response from each of the managed components including the list of producible, self-described event types, attributes of each producible, self-described event type, and a grammar to which each producible, self-described event type conforms;

process each response to define desired event types as triggers for steps in an automated workflow;

store, in the memory, the event types defined as triggers in the automated workflow;

monitor the plurality of managed components and detect events of the event types defined in the automated workflow and stored in the data store;

process each detected event to create a machine readable data payload containing event information including the event type, event attributes, and a grammar to which the event conforms; and process the data payload in the manner defined by the automated workflow by using the provided grammar of the event type to interpret the attributes of the event and perform one or more actions defined by the automated workflow.

8. The apparatus of claim 7, wherein the processor is operative with said program in memory to
present event information to a user including producible event types of managed components, attributes of each event type, and a grammar to which each event type conforms;
receive user responses for selection of desired event types for definition as triggers to the automated workflow;
further receive user responses for selection of desired attributes of each event type as arguments to steps in the automated workflow; and
process the user responses to create the automated workflow.

9. The apparatus of claim 7, wherein the data payload is in XML form with an associated XML Schema attached to the event.

10. The apparatus of claim 7, wherein the data payload is in XML form with an associated DTD attached to the event.

11. The apparatus of claim 7, wherein the data payload is in XML form and an associated XML Schema is obtained by querying the managed component that produced the event.

12. The apparatus of claim 7, wherein the data payload is in XML form and an associated DTD is obtained by querying the managed component that produced the event.

13. A system for presenting event type information comprising:
a web browser client;
a graphical viewer in communication with the web browser client, the graphical viewer operative to display event type information including producible event types of managed components, attributes of each event type, and a grammar to which each event type conforms, the event type information comprising a list of a plurality of producible event types that may be experienced by a managed component, the list of the plurality of event types received in response to a query of the managed component, the list of the plurality of producible event types comprising event types that are possible but have not yet been experienced by the managed component;
a server application in communication with the web browser client, the server application in communication with an event database and an event application, the server application operative to receive a request for event type information, query the event application and access the event database to respond to a request for event type information; and
a remote data server in communication with the graphical viewer, the remote data server further in communication with at least one platform-specific event database, the remote data server operative to receive a request for platform-specific event type viewing data, the remote data server further operative to query the platform-specific event database and respond to the request for platform-specific event viewing data.

14. A computer-readable storage medium encoded with processing instructions for creating and using self describing events in automation, the processing instructions for directing a computer to perform the steps of:
querying a plurality of managed components of a computing system to identify a list of producible, self-described event types that may be experienced by the plurality of managed component for use in generating an automated workflows;
in response to the query, receiving a response from each of the managed components including the list of producible, self-described event types, attributes of each producible, self-described event type, and a grammar to which each producible, self-described event type conforms;
processing each response to define desired event types as triggers for steps in an automated workflow;
storing, in a data store, the event types defined as triggers in the automated workflow;
monitoring the plurality of managed components and detecting events of the event types defined in the automated workflow and stored in the data store;
processing each detected event to create a machine readable data payload containing event information including the event type, event attributes, and a grammar to which the event conforms; and
processing the data payload in the manner defined by the automated workflow by using the provided grammar of the event type to interpret the attributes of the event and perform one or more actions defined by the automated workflow.

* * * * *